US009041632B2

(12) United States Patent
Funk et al.

(10) Patent No.: US 9,041,632 B2
(45) Date of Patent: May 26, 2015

(54) DEVICE FOR DISPLAYING A TEXT MESSAGE

(75) Inventors: Andreas Funk, Schwäbisch Gmünd (DE); Marco Biegert, Schwäbisch Gmünd (DE)

(73) Assignee: Biegert & Funk Product Gmbh & Co. KG, Schwabisch Gmund (DE)

( * ) Notice: Subject to any disclaimer, the term of this patent is extended or adjusted under 35 U.S.C. 154(b) by 1168 days.

(21) Appl. No.: 12/690,491

(22) Filed: Jan. 20, 2010

(65) Prior Publication Data

US 2011/0157186 A1 Jun. 30, 2011

(30) Foreign Application Priority Data

Dec. 29, 2009 (DE) ..................... 20 2009 017 703 U

(51) Int. Cl.
*G06T 11/00* (2006.01)
*G04G 9/10* (2006.01)

(52) U.S. Cl.
CPC ...................................... *G04G 9/102* (2013.01)

(58) Field of Classification Search
CPC ................ G09G 2300/0842; G09G 2320/043; G09G 3/3233; G09G 2300/0861; G09G 2300/0819
USPC ........................ 345/82; 368/82–84, 241–242; 340/815.45, 815.53; 702/178; 341/21
See application file for complete search history.

(56) References Cited

U.S. PATENT DOCUMENTS 2,920,408 A * 1/1960 McGuire ......................... 40/452
4,271,497 A * 6/1981 Terzian ........................... 368/82
4,383,254 A * 5/1983 Gemmell et al. ............. 345/156
4,406,998 A * 9/1983 Willough ................... 340/815.4
4,574,269 A * 3/1986 Miller ........................... 362/503
4,757,484 A * 7/1988 Pardo ............................ 368/223
5,257,020 A * 10/1993 Morse ........................ 340/908.1
5,638,052 A * 6/1997 Furuya et al. ............ 340/815.45
6,175,342 B1 * 1/2001 Nicholson et al. ............. 345/1.1
6,307,813 B1 * 10/2001 Leggio ............................ 368/63
6,751,165 B2 * 6/2004 Blonder ........................... 368/82
2007/0258336 A1 * 11/2007 Bailey ........................... 368/223

FOREIGN PATENT DOCUMENTS

EC 000712484-0006 8/2007

OTHER PUBLICATIONS

Word Clock; 2008; Simon Heys; http://www.simonheys.com/wordclock/.*
"Sam Buxton shows at Kinetica", dezeen Magazine, Jan. 18, 2007, URL: http://www.dezeen.com/2007/01/18/sam-buxton-shows-at-kinetica/.

* cited by examiner

*Primary Examiner* — Xiao M. Wu
*Assistant Examiner* — Todd Buttram
(74) *Attorney, Agent, or Firm* — Vidas, Arrett & Steinkraus

(57) ABSTRACT

A device for displaying a text message, comprising a display (10) having a plurality of characters, each of said characters being arranged at a fixed position, not overlapping with any other of said characters, and being adapted to be switched on and off, and a controller being connected to said plurality of characters and being adapted to switch on and off selected characters so that at a given time, a selected sub-group of said characters is switched on, the selected sub-group displaying a text message.

16 Claims, 7 Drawing Sheets

DEVICE FOR DISPLAYING A TEXT MESSAGE

CROSS-REFERENCE TO RELATED APPLICATIONS

Not applicable.

STATEMENT REGARDING FEDERALLY SPONSORED RESEARCH

Not applicable.

BACKGROUND OF THE INVENTION

The invention relates to a device for displaying a text message, in particular to a clock which displays the time as a text message. Clocks are one of the oldest human developments, meeting the need to consistently measure intervals of time shorter than the natural units, the day, the lunar month and the year. Each clock includes an indicator which displays the count of seconds, minutes and/or hours in a human readable form. Clocks commonly referred to as analog clocks display the time in analog form with moving hour and minute hands. Digital clocks display the time in a periodically changing digits on a digital display.

These displays in most cases comprise at least four digits, two digits for indicating the hour and two further digits for indicating the minute. Optionally, a fifth and sixth digit may be used for indicating the second. In a simple and well-known form each digit is made up of seven segments arranged in a certain pattern which allows to form the Arabic numerals from 0 to 9 by selectively switching on specific combinations of these segments.

Other types of clocks display a graphical representation of time, for example by representing the minutes by a varying length of a bar, which may be provided with a scale.

From the registered European community design No. 712484-0006, the entire contents is incorporated herein by reference, a clock has become known having a display showing the time as a text message reading for example "twelve seventeen".

In addition, it is of course also known to display text message as well as the time on a non-dedicated type of display, for example a computer monitor, in various formats.

Based upon this prior art it is an object of the invention to provide a device for displaying a text message which displays the text message in an alternative, easily readable and appealing way.

BRIEF SUMMARY OF THE INVENTION

The inventive device for displaying a text message comprises a display having a plurality of characters, each of said characters being arranged at a fixed position, not overlapping with any other of said characters, and being adapted to be switched on and off, and a controller being connected to said plurality of characters and being adapted to switch on and off selected characters so that at each given time, a selected sub-group of said characters is switched on, the selected sub-group displaying a text message.

A character is a symbol of a type used as a component of a text. Each character has a certain meaning. In particular, a character may be a letter of an alphabet used as a writing system anywhere in the world, such as for example a letter of the Latin, Cyrillic, Greek, Georgian, Armenian or Hebrew alphabet. A character may also be a numeral, in particular a numeral selected from the Arabic numbers of 0 to 9.

The plurality of characters includes a fixed number of characters which is large enough that a desired text message can be displayed. Each character has a fixed position, so that the entirety of the characters is positioned in a fixed pattern. Moreover, the characters do not overlap, which means that each character has its distinct and separate position. The display may have a flat surface which comprises all of the characters.

The characters are adapted to be switched on and off which means that each character has two different operating states, which may also be referred to as an activated and a non-activated state. These two states are visibly different. When switched on, a character should be easily distinguishable from a background, which may be accomplished for example by changing brightness, colour, reflectivity, or any other feature of the character which can easily be detected by the human eye. When switched off, a character appears visibly different, which means that it can easily be distinguished from a character which is switched on. It does not necessarily mean that a character switched off cannot easily be distinguished from a background. In particular, switching on and off may be performed by using any form of a light source selectively illuminating a character or a group of characters. In the alternative, the appearance of a character may be altered by mechanically turning a member comprising the character, so that the viewing angle on that character changes. It is also possible to change the reflectivity of the characters, as it is known from so-called electronic paper (e-paper).

The controller may be an electronic device.

The sub-group of characters displays a text message, for example a short text comprising one or more words or sentences and having a certain meaning. The text message may be in any language.

At a given time or at each given time, there will be certain characters which are switched on, while at the same time certain other characters are switched off. In other words, the selected sub-group of characters which is switched on at a given time is always less than the entirety of characters comprised in the display.

According to an aspect, the device is a clock and the selected sub-group of said characters is displaying the time as a text message, which means that a readable text is displayed. The text message may include words and/or numbers, and may be in any language. The number of characters is large enough that each given time during a day or, if the time is represented in a 12 hours-format, half a day, can be represented.

When the device is a clock, the controller may include a time-keeping element such as an oscillator, preferably a quartz crystal. In addition, it may be synchronised with an atomic clock with time signals from a government radio station or the like, as is commonly done in so-called radio clocks.

Reading the time in the form of a text message is very easy and does not require to study any explanations or an operating manual on how the display is to be understood. It is also very interesting to look at the inventive clock and to observe how the text message changes when the time is passing by.

According to an aspect of the invention, said characters are arranged in a two-dimensional matrix. The matrix may be rectangular like a chess board, or may have any other shape. Arranging the characters in such a matrix not only leads to a very pleasant design, but also improves the readability of the text message.

According to an aspect of the invention, at least some of said characters are arranged such that adjacent characters form words. The adjacent characters may be arranged in rows or columns and form words to be read for example from left-to-right, or from top-to-bottom. In a text message, words and numerals may be mixed. In the alternative, however, all of the characters used in any of the text messages are arranged in groups of adjacent characters, with each of the groups forming a word. In this way, the text messages, in particular when displaying the time, gain the most consistent appearance.

According to an aspect of the invention, said plurality of characters comprises a first group of characters for displaying an hour and a second group of characters for displaying a minute. In particular, the first group of characters may include first characters or first groups of adjacent characters representing the hours from one to twelve. The second group of characters may include second characters or second groups of adjacent characters representing the minutes from 0 to 59 in intervals of one minute or more. For example, there may be second characters or second groups of characters representing each of the minute steps of 0, 5, 10, 15, 20, 25, 30, 35, 40, 45, 50, and 55. In this way, the second group of characters is adapted to display the time in steps of 5 minutes, which is another preferred aspect of the invention. In an alternative, however, the first and second groups of characters may consist of a selection of words and/or numbers which are more closely related to specific terms used in a given natural language for indicating the time. An example is that it is often said that "it is a quarter to five" instead of using "45 minutes". For this reason, for example the words "a quarter", "half", "to", and "past" may be used, formed by groups of adjacent characters.

According to an aspect of the invention, the display comprises four additional graphical elements being adapted to be switched on and off, said four additional graphical elements being connected to said controller, wherein said controller is adapted to switch on and off a selected number of the additional graphical elements to display the minute of a given time in steps of one minute. The additional graphical elements may be for example dots, lines, or any other geometrical shapes. These additional graphical elements do not form a part of the text message. However, they allow to increase the precision of the clock without having to use too many different characters. The additional graphical elements may be positioned each at a fixed position of the display, for example at four edges thereof, or in a row at the bottom, top or side of the display or the characters, respectively.

According to an aspect of the invention, said first group of characters is arranged in a first block and said second group of characters is arranged in a second block, said first block being positioned below or to the right of said second block. This specific arrangement adds to the readability of the text message.

According to an aspect of the invention, the controller is adapted to display an hour and a minute of a given time in turn with a second, wherein said second is displayed by switching on selected sub-groups of said characters, thereby defining a pattern which represents a two-digit number indicative of the second. According to this aspect, the text message is displayed in every other time interval, wherein in the intermediate time intervals, additional information on the second of the current time is presented. Switching between the text message and the second representation may be performed automatically in regular intervals, or by user interaction, for example by pressing a button.

According to an aspect of the invention, the words comprise one or more words having the meaning of "IT IS" so that the text message has the form of a sentence. In a similar fashion, one or more words having the meaning of "O'CLOCK" may be provided.

According to an aspect of the invention, whenever a first character arranged at a first position is switched off, a second character arranged at a second position different from the first position is switched on.

According to an aspect of the invention, said display comprises a front plate, said plurality of characters being embedded in or covered by said front plate. The front plate may comprise a metal sheet including throughholes having the shapes of the characters. These throughholes may be machined by stamping or laser cutting, for example. The front plate may also comprise a plastics material which comprises the characters in a similar way. In these examples, the characters are embedded in the front plate. In an alternative, the front plate may also be used as a cover which covers the characters being defined as separate members, or defined within a separate member.

According to an aspect, said front plate comprises transparent areas defining the characters, the transparent areas being surrounded by non-transparent areas. Such a front plate design is particularly well suited for background lighting of the characters.

According to an aspect, said front plate comprises a plate of glass or acrylic glass and a non-transparent layer. The non-transparent layer may have openings or though-holes defining the characters.

According to an aspect, said display comprises a diffusion layer. The diffusion layer may have a translucency in the range of 30% to 70%, for example. The diffusion layer may be a part of the front plate. It serves to achieve a smooth and uniform brightness and appearance of the characters, in particular if these are illuminated from a rear side, through the diffusion layer.

According to an aspect, said display comprises a base plate connected to the front plate, wherein the base plate comprises a plurality of recesses, each recess being disposed beneath one of said characters, wherein a light source is disposed in each of the recesses. The light sources may be bulbs or light-emitting diodes (LEDs), or any other suitable light sources. The recesses may be shaped conically or cylindrically, for example. The walls of the recesses may comprise a reflective surface, which may be achieved by a reflective coating. The base plate may be attached directly to the front plate. The plurality of recesses and light sources may be arranged in a pattern similar to the pattern of the plurality of characters, or of any words formed out of groups of adjacent characters. The base plate with recesses and light sources helps to achieve a very compact design of the display in combination with a precise illumination of each of the words or characters.

According to an aspect, said controller comprises a printed circuit board assembly which is attached to said base plate. This particular design of the controller adds to a compact and flat configuration of the device. The printed circuit board assembly may include direct connections to the plurality of light sources, so that no further wiring is needed.

According to an aspect, said display comprises an illumination device. The illumination device is used to display characters that are switched on with a brightness different from the brightness of a characters that are switched off. The illumination device may have a plurality of light sources, each light source being arranged such that it illuminates only one of the characters or words. Activating one of the light sources in this case illuminates selectively only one of the characters or words. However, a plurality of light sources may be arranged such that it illuminates the same character or word.

Again, the light sources may be bulbs or LEDs, for example. Using dedicated light sources for the illumination of the characters or words helps to obtain a high-contrast display. In the alternative, the illumination device may provide a more uniform lighting, such as a backlight illuminating the entire matrix of characters. In this case, the different brightness may be achieved by changing the opacity of the characters when switching these on and off. To this end, a liquid crystal matrix may be used, or a mechanical mechanism moving a member which covers or uncovers a character.

According to an aspect of the invention, said display comprises an LCD panel. The LCD panel may include a backlight. The entire LCD panel may be used as an illumination device, that is that bright areas of the panel may be used to shed light on the characters which are defined in a member separate from the LCD panel. In the alternative, the characters may be displayed on the LCD panel, so that the same is used as said display of the device. For example, the LCD panel of a mobile phone may be used as a display in this way.

According to an aspect of the invention the display is adapted such that a character switched on is easily readable and a character switched off is still visible, but less accentuated. According to this aspect, the entirety of characters is always visible, which leads to a particularly interesting appearance of the device.

In the following, the invention is explained in greater detail on the basis of preferred embodiments shown in seven drawings. All embodiments refer to the specific use of the inventive device as a clock. However, the invention may be used as well for any other forms of devices for displaying a text message.

DETAILED DESCRIPTION OF THE INVENTION

Figure 1:
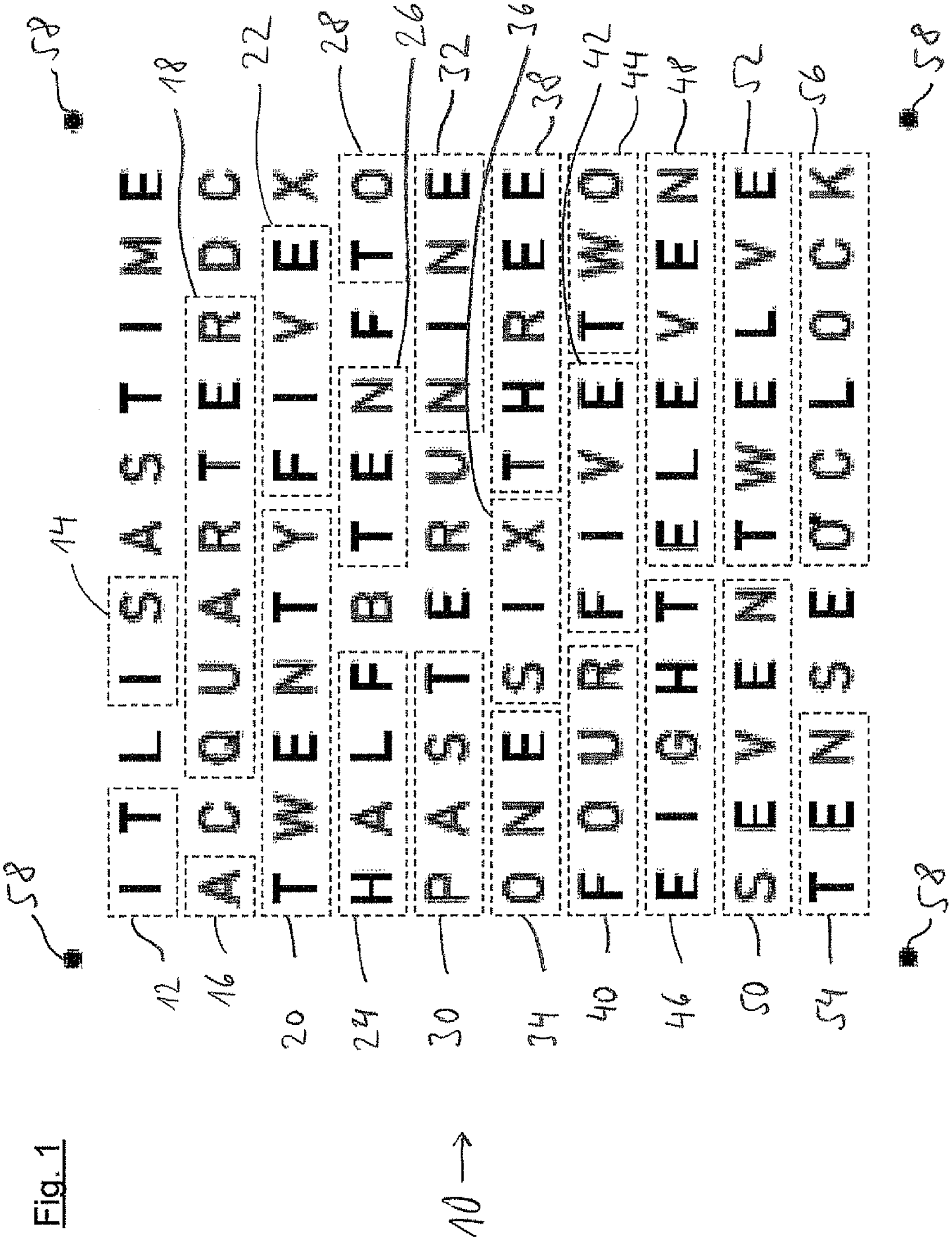
FIG. 1 shows a display of a first embodiment of the clock in the English language.

While this invention may be embodied in many different forms, there are described in detail herein a specific preferred embodiment of the invention. This description is an exemplification of the principles of the invention and is not intended to limit the invention to the particular embodiment illustrated FIG. 1 shows a front view on a display 10 having a plurality of words 12-56. In the figure each word 12-56 is encircled for illustrative reasons by a dashed line which does not form a part of the display. Each of the words 12-56 consists of a number of adjacent characters, wherein each of the characters is arranged at a fixed position of the display. In this example, all of the characters are letters of the Latin alphabet. The various characters do not overlap with each other. For example, the word 12 which is comprising the two letters I and T and has the meaning of the word "IT". The letters I and T do not overlap with each other or any other letter of the display.

The word 14 has the meaning of "IS", the word 16 has the meaning of "A", the word 18 has the meaning of "QUARTER", the word 20 has the meaning of "TWENTY", the word 22 has the meaning of "FIVE", the word 24 has the meaning of "HALF", the word 26 has the meaning of "TEN", the word 28 has the meaning of "TWO", the word 30 has the meaning of "PAST", the word 32 has the meaning of "NINE", the word 34 has the meaning of "ONE", the word 36 has the meaning of "SIX", the word 38 has the meaning of "THREE", the word 40 has the meaning of "FOUR", the word 42 has the meaning of "FIVE", the word 44 has the meaning of "TWO", the word 46 has the meaning of "EIGHT", the word 48 has the meaning of "ELEVEN", the word 50 has the meaning of "SEVEN", the word 52 has the meaning of "TWELVE", the word 54 has the meaning of "TEN" and the word 56 has the meaning of "O'CLOCK".

The characters of each of the words 12-56 are arranged in a rectangular matrix which is eleven characters wide and ten characters high. Between some of the words 12-56, there are further characters used to fill up the matrix. These do not belong to the plurality of words 12-56 and do not contribute to any text message. The characters of each word 12-56 are arranged in a horizontal row, so that they can be read in the usual manner from left to right. Each of the rows contains at least two of the words 12-56.

In the example, not only the characters are not overlapping, but also the words 12-56 are not overlapping. However, it is also possible to use one or more characters of a display for forming different words. For example, a row of characters may read "S E V E N I N E". These characters can be used to form the two words "SEVEN" and "NINE", wherein the middle letter "N" of the row is used on the one hand as last letter of the word "SEVEN" and on the other hand as first letter of the word "NINE". Nevertheless, each of the characters has its unique and fixed position. At this very position, only this particular character can be displayed.

Each of the characters is adapted to be switched on and off. In the preferred embodiments shown herein, switching on and off is done by turning on a light source which is illuminating the character. However, any other form of changing the state of a character leading to a clearly visible difference between the two different states "ON" and "OFF" can be referred to as switching on and off a character.

In addition to the characters forming the words 12-56 and the further characters used to fill up the matrix, the display of FIG. 1 contains four additional graphical elements 58, which each have the shape of a dot or little circle and are arranged at the four edges of the display, each being spaced from one of the four edges of the matrix with the characters.

In order to indicate the current time, at each given time, a selected sub-group of the characters is switched on by a controller which is connected to said plurality of characters. The selected sub-group then displays the time as a text message. For example, when it is 11:55, the characters forming the words 12, 14, 22, 28 and 52 may be switched on in order to form the selected sub-group. The text message displaying the time then reads: "IT IS FIVE TO TWELVE". In another example when it is 10:00, the characters forming the words 12, 14, 26 and 56 form the selected sub-group which is switched on so that the corresponding text message reads: "IT IS TEN O'CLOCK".

The display 10 shown in FIG. 1 thus serves to display the time as a text message in steps of five minutes. For further accuracy, at each minute count between two of the 5 minutes steps, a selected number of the four additional graphical elements 58 are switched on by the controller. For example, between 4:30 and 4:34, the text message displayed by the selected sub-group of characters will always read: "IT IS HALF PAST FOUR". At 4:30, none of the graphical elements 58 will be switched on, at 4:31, one of the graphical elements 58 will be switched on, at 4:32 two of the graphical elements 58 will be switched on, at 4:33, three of the graphical elements 58 will be switched on and at 4:34, all four graphical elements 58 will be switched on. When the time passes on to 4:35, all graphical elements 58 will be switched off, and the text message will change to read: "IT IS TWENTYFIVE TO FIVE".

Figure 2:
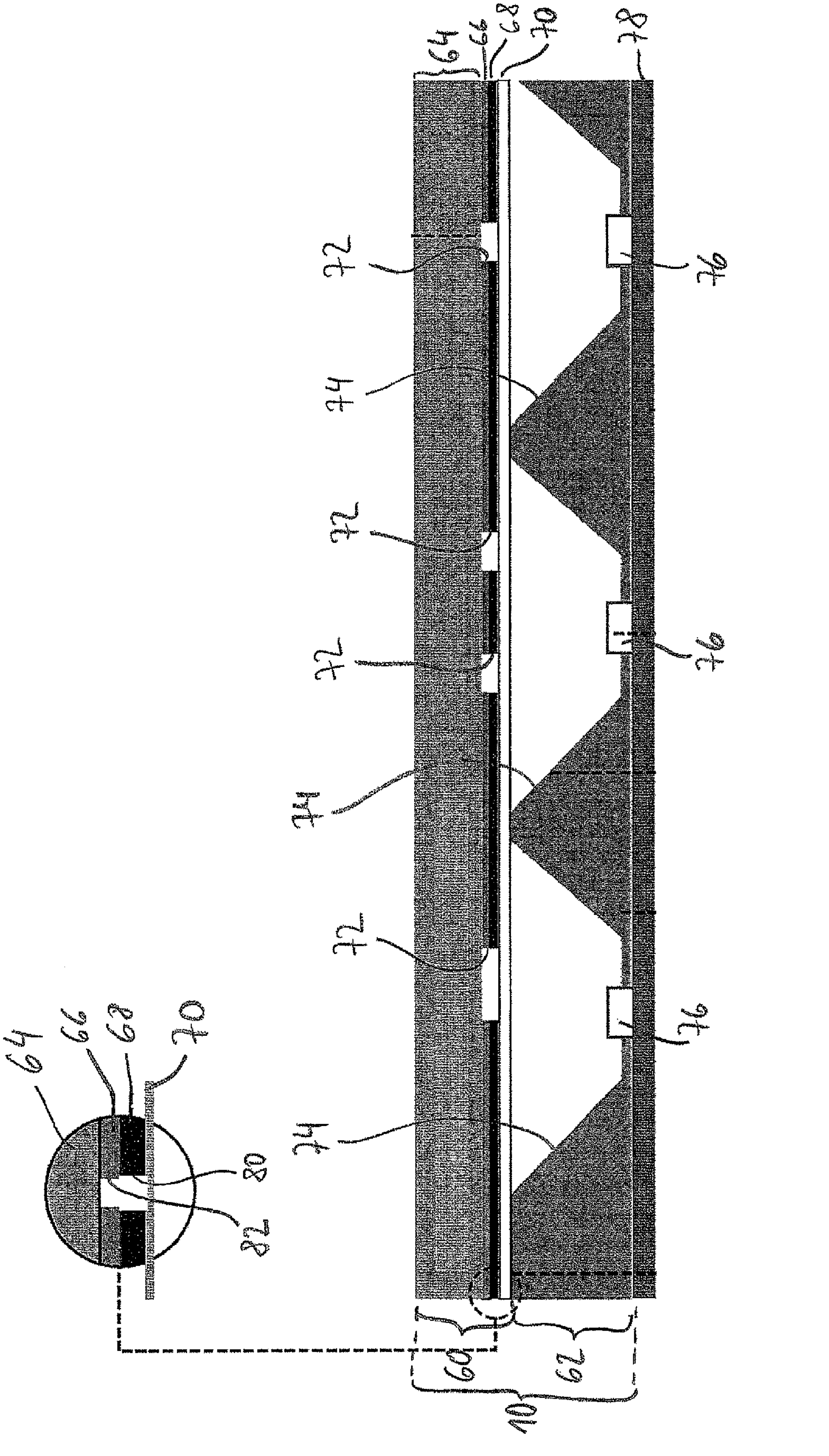
FIG. 2 shows a cross-section through a part of the display of FIG. 1.

FIG. 2 shows a part of the clock with the display 10 of FIG. 1 in cross section at the bottom part of the figure. The display 10 comprises a front plate 60 and a base plate 62. The front plate 60 consists of four layers 64 to 70 lying upon one another. The uppermost layer is formed by a transparent glass plate 64, which may be colourless or coloured. A second layer is formed by a coloured layer 66 which has been formed by coating of the lower surface of the glass plate 64. The coloured layer 66 gives the display a desired colour. It is visible through the transparent glass plate 64. A third layer is formed by a non-transparent layer 68, which may in addition to its non-transparency be reflective. It has been formed by coating of the first coloured layer 66, for example using a printing technique. The non-transparent layer 68 is light-proof and opaque and serves to block any light falling on its bottom surface from shining through the front plate 60.

The coloured layer 66 and the non-transparent layer 68 have corresponding openings 72 at the positions of the various characters. Through these openings 72 light can pass from below the front plate 60 through the opening 72 and the glass plate 64, so that the openings 72 defining the characters are visible from the front side of the front plate 60.

The front plate 60 comprises a fourth layer in the form of a diffusion layer 70 which may preferably have a translucency of 30% to 70%. The diffusion layer 70 leads to that one cannot look through the front plate 60, and that the characters defined by the openings 72 have a uniform brightness and appearance.

Attached to the front plate 60 and arranged below the same, there is a base plate 62. The base plate 62 has a plurality of cone-shaped recesses 74 which are facing the front plate 60. Each of the recesses 74 is coated with a white, reflective coating. At the bottom of each cone-shaped recess 74 there is disposed a light source 76, which is a light emitting diode (LED), which preferably has a large angle of radiation of between 100° to 140°.

The controller is provided in the form of a printed circuit board assembly 78, which is attached to the bottom of the base plate 62 and makes direct contact to each of the light sources 76.

At the top of FIG. 2 an enlarged view on a section of the front plate 60 including an opening 72 is shown. The four layers can be seen, that is the glass plate 64, the coloured layer 66, the non-transparent layer 68 and the diffusion layer 70. One can see that the opening is formed through both the coloured layer 66 and the non-transparent layer 68. A portion 80 of the opening provided in the non-transparent layer 68 is wider than the corresponding portion 82 of the opening provided in the coloured layer 66. In other words, the coloured layer 66 extends beyond the non-transparent layer 68. This serves to obtain a smooth appearance of the borders of the opening even if inaccuracies during the production of the layers occur.

Figure 3:
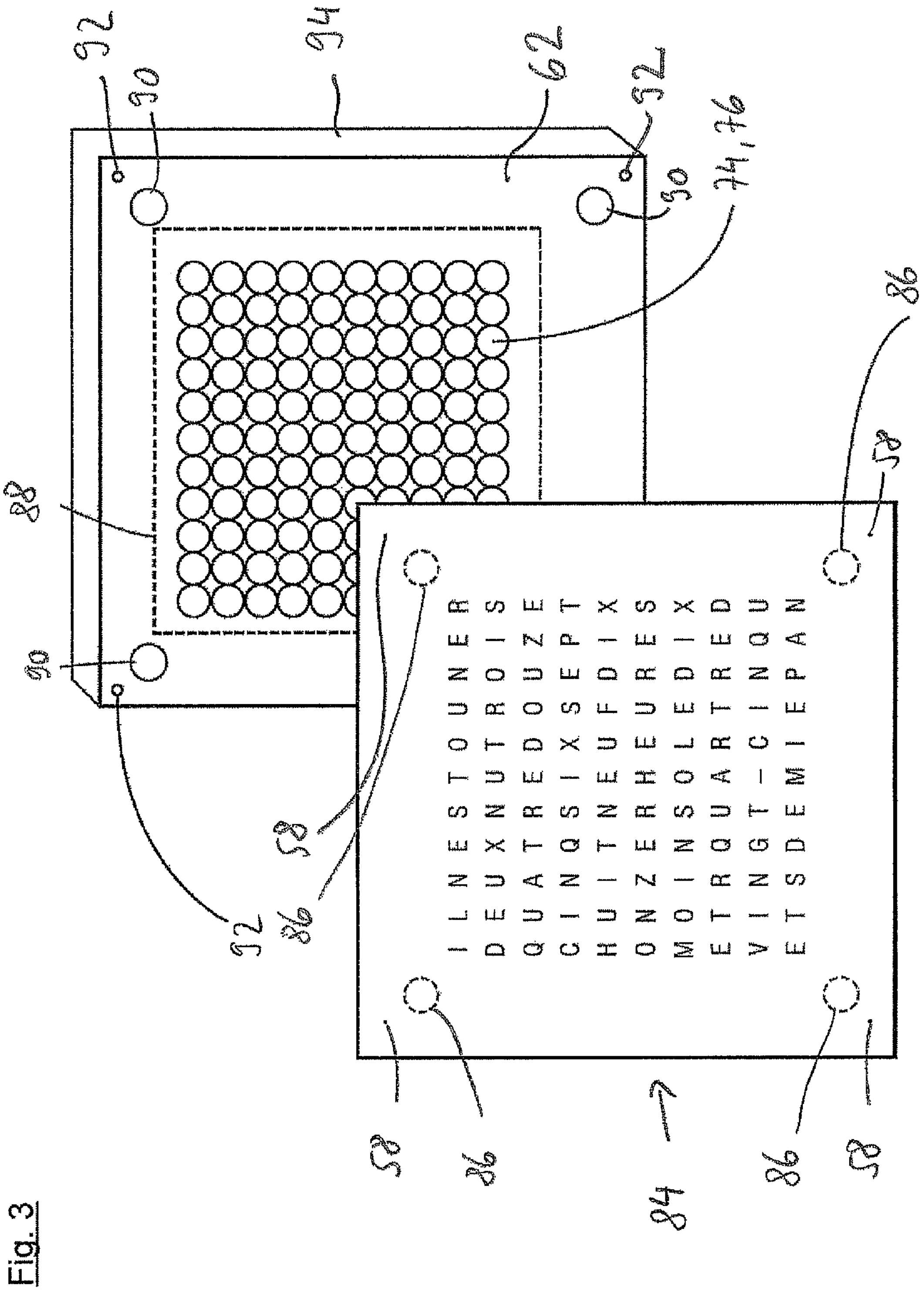
FIG. 3 shows an exploded view of a second embodiment of a display having a front plate and base plate.

FIG. 3 shows another embodiment of an inventive clock having a front plate 84 which is similar to the front plate shown in FIG. 1 except for its language, which is French. The front plate 84 comprises a plurality of characters and four additional graphical elements 58 arranged near the four edges of the front plate 84. However, the front plate 84 is made of or comprises an additional layer of a magnetic metal, or is provided with attachments of a magnetic metal 86 in the areas indicated by dashed circles.

FIG. 3 also shows a base plate 62 which is similar to the base plate 62 shown in FIG. 2. The base plate 62 comprises a plurality of recesses 74 each comprising a light source 76, the recesses 74 and light sources 76 both being arranged in a rectangular matrix of eleven by ten elements. The positions of the recesses 74 and light sources 76 correspond to the positions of the characters embedded in the front plate 84.

In the embodiment of FIG. 3, a diffusion layer 88 is connected to the base plate 62. The diffusion layer 88 has a rectangular shape and covers the entirety of the recesses 74 in the base plate 62. Circular magnets 90 are affixed to the base plate 62 near the four edges thereof, corresponding to the positions of the magnetic material 86 connected to the front page 84. In this way, the front plate 84 can easily be attached to the base plate 62 and held in its position by magnetic forces. The base plate 62 further comprises four additional light sources 92 disposed near the edges of the base plate 62, which correspond to the positions of the four additional graphical elements 58 in the front plate 84. The base plate 62 and a controller not visible in the figure and attached to the bottom of the base plate 62 are disposed within a rectangular housing 94.

Figure 4:
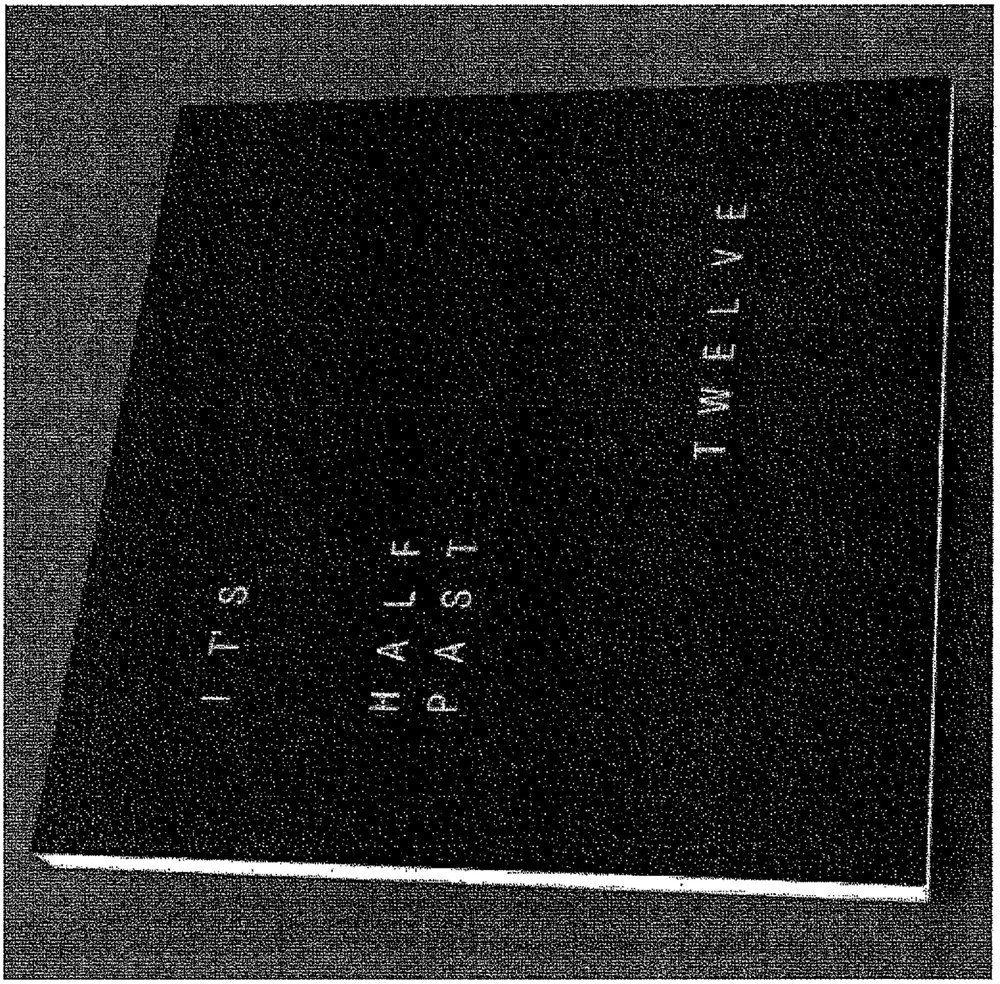
FIG. 4 shows a perspective view on a clock having the display of FIG. 1 in operation.

FIG. 4 shows a perspective view on an inventive clock with the display of FIG. 1 in operation. In this view the text message "IT IS HALF PAST TWELVE" is easily readable, whereas the remainder of the characters not forming part of the selected sub-group is not visible. However, it is to be noted that the remainder of characters which is switched off at a given time may still be visible, but less accentuated than the characters which are switched on.

Figure 5:
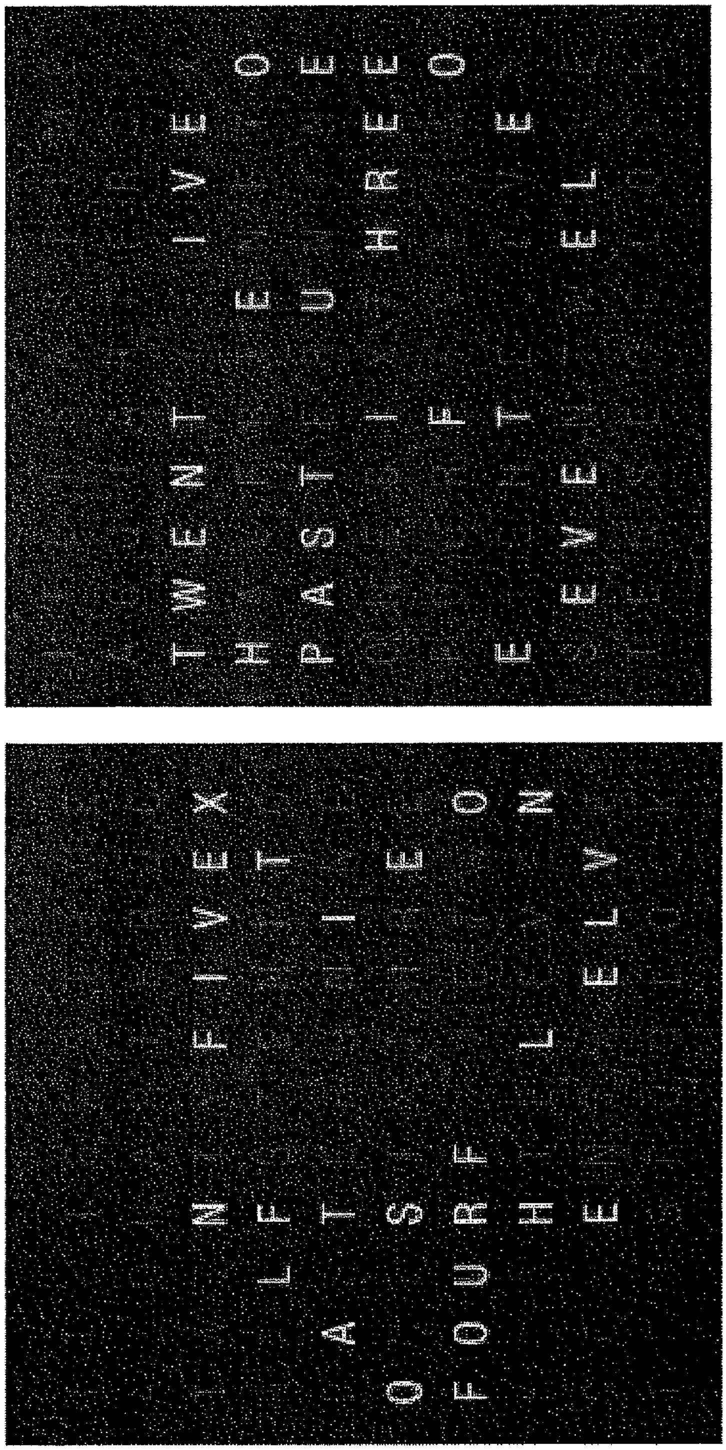
FIG. 5 shows two front views of the display of FIG. 1 in operation when indicating the seconds.

FIG. 5 shows two views on the display of FIG. 1 in a state in which no text message is shown. Instead, the display of FIG. 1 is used to show the second of a given time by switching on selected sub-groups of said characters switched on define a pattern which represents a two-digit number indicative of the second. In the example to the left, the second count is 43, in the example to the right, it is 59.

Figure 6:
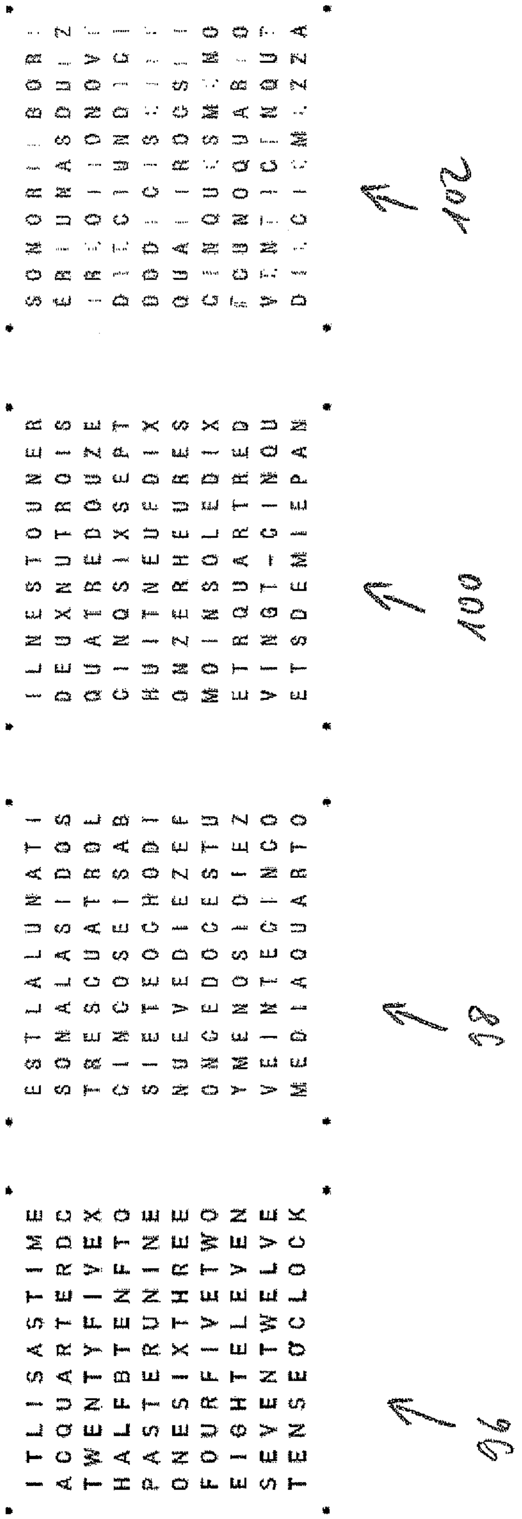
FIG. 6 shows further embodiments of inventive displays using different languages.

FIG. 6 shows four embodiments of inventive displays 96 to 102. Each of them is similar to the display 10 of FIG. 1. They differ only in the language used for the words and for the text message. Display 96 is in English and is identical to the display 10 shown in FIG. 1. Display 98 is in Spanish, display 100 is in French and display 102 is in Italian. This shows that the inventive clock can be equipped with displays in any desired language.

Figure 7:
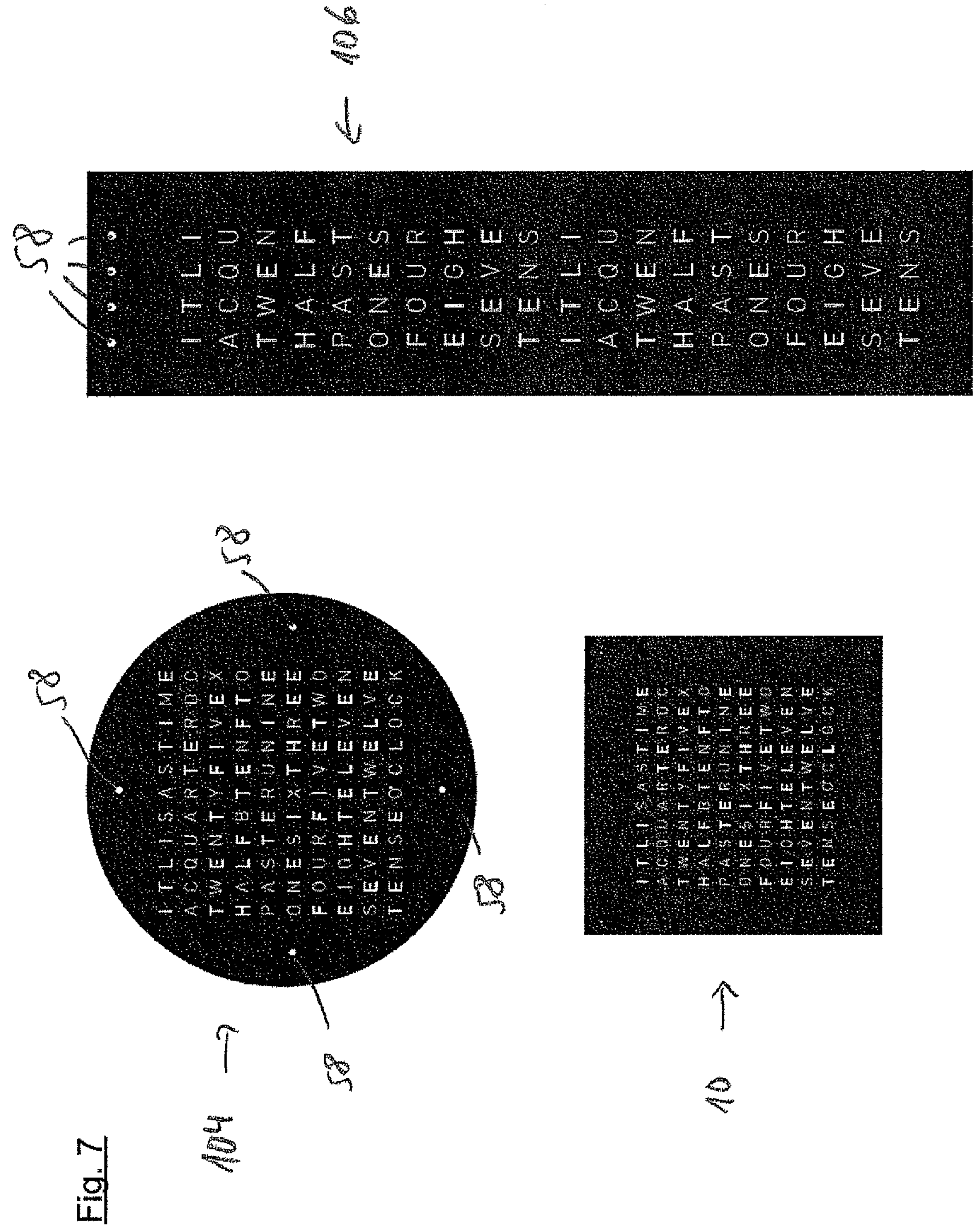
FIG. 7 shows further embodiments of displays in different geometric shapes.

FIG. 7 shows that the inventive clock and its display are not limited to any specific shape. To the upper left of the figure, the display has an "eleven by ten" matrix, similar to that in FIG. 1, whereas the four additional graphical elements 58 are not arranged at the edges of the matrix, but at the four sides thereof. The entire display 104 is circular. The example shown to the bottom left of FIG. 7 is identical to the display 10 shown in FIG. 1. This display is quadratic. To the right of FIG. 7 a display 106 is shown which has a "four by twenty" matrix, that is a matrix which is four characters wide an twenty characters high. In this example, some or all of the words formed by these characters may extend through more than one line. Display 106 also comprises four additional graphical elements in the form of dots 58, which are arranged in a horizontal row to the top of the matrix.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

What is claimed is:

1. A device for displaying a text message, comprising:

a display (10) having four edges and having a plurality of characters, each of said characters being arranged at a fixed position, not overlapping with any other of said characters, and being adapted to be switched on and off, and a controller being connected to said plurality of characters and being adapted to switch on and off selected characters so that at a given time, a selected sub-group of said characters is switched on, the selected sub-group displaying a text message, wherein said characters are arranged in a two-dimensional matrix which is filled with characters such that at each position of the matrix a single character is disposed, wherein at least some of the characters are arranged such that adjacent characters form words wherein the device is a clock and the selected sub-group of said characters is displaying the time as a text message, wherein said plurality of characters comprises a first group of characters for displaying an hour and a second group of characters for displaying a minute, wherein said second group of characters is adapted to display the time in steps of five minutes, wherein the display (10) comprises four additional graphical elements (58) not forming a part of the text message and being adapted to be switched on and off, said four additional graphical elements (58) being connected to said controller, wherein said controller is adapted to switch on and off a selected number of the additional graphical elements (58) to display the minute of the given time in steps of one minute, and further wherein said four additional graphical elements are positioned at the four edges of the display.

2. The device of claim 1, wherein said second group of characters comprises a first group of adjacent characters forming a first word (30) having the meaning of "PAST" and a second group of adjacent characters forming a second word (28) having the meaning of "TO".

3. The device of claim 1, wherein said first group of characters is arranged in a first block and said second group of characters is arranged in a second block, said first block being positioned below or to the right of said second block.

4. The device of claim 1, wherein the controller is adapted to display an hour and a minute of each given time in turn with a second, wherein said second is displayed by switching on selected sub-groups of said characters, thereby defining a pattern which represents a two-digit number indicative of the second.

5. The device of claim 1, wherein the words (12-56) comprise one or more words (12, 14) having the meaning of "IT IS", so that the text message has the form of a sentence.

6. The device of claim 1, wherein whenever a first character arranged at a first position is switched off, a second character arranged at a second position different from the first position is switched on.

7. The device of claim 1, wherein said display (13) comprises a front plate (60), said plurality of characters being embedded in or covered by said front plate (60).

8. The device of claim 7, wherein said front plate (60) comprises transparent areas defining the characters, the transparent areas being surrounded by non-transparent areas.

9. The device of claim 7, wherein said front plate (60) comprises a plate of glass (64) or acrylic glass and a non-transparent layer (68).

10. The device of claim 7, wherein said front plate (60) comprises a diffusion layer (70).

11. The device of claim 7, wherein said display (10) comprises a base plate (62) connected to said front plate (60), wherein said base plate (62) comprises a plurality of recesses (74), each recess being disposed beneath one of said characters, wherein a light source (76) is disposed in each of the recesses.

12. The device of claim 11, wherein said controller comprises a printed circuit board assembly (78) which is attached to said base plate (62).

13. The device of claim 1, wherein said display (10) comprises an illumination device.

14. The device of claim 1, wherein said display (10) comprises an LCD panel.

15. The device of claim 1, wherein the display (10) is adapted such that a character switched on is easily readable and a character switched off is still visible, but less accentuated.

16. A device for displaying a text message, comprising:

a display (10) having four edges and having a plurality of characters, each of said characters being arranged at a fixed position, not overlapping with any other of said characters, and being adapted to be switched on and off, and a controller being connected to said plurality of characters and being adapted to switch on and off selected characters so that at a given time, a selected sub-group of said characters is switched on, the selected sub-group displaying a text message, wherein said characters are arranged in a two-dimensional matrix which is filled with characters such that at each position of the matrix a single character is disposed, wherein at least some of the characters are arranged such that adjacent characters form words wherein the device is a clock and the selected sub-group of said characters is displaying the time as a text message, wherein said plurality of characters comprises a first group of characters for displaying an hour and a second group of characters for displaying a minute, wherein said second group of characters is adapted to display the time in steps of five minutes, wherein the display (10) comprises four additional graphical elements (58) not forming a part of the text message and being adapted to be switched on and off, said four additional graphical elements (58) being connected to said controller, wherein said controller is adapted to switch on grid off a selected number of the additional graphical elements (58) to display the minute of the given time in steps of one minute, and further wherein the four additional graphical elements are positioned in a row at the bottom, top or side of the display.

* * * * *